May 13, 1969 D. A. WOLF 3,443,825
SHIFT CONSOLE FOR BICYCLE
Filed July 3, 1967

INVENTOR
DONALD A. WOLF

BY
Marechal, Biebel, French y Bugg
ATTORNEYS

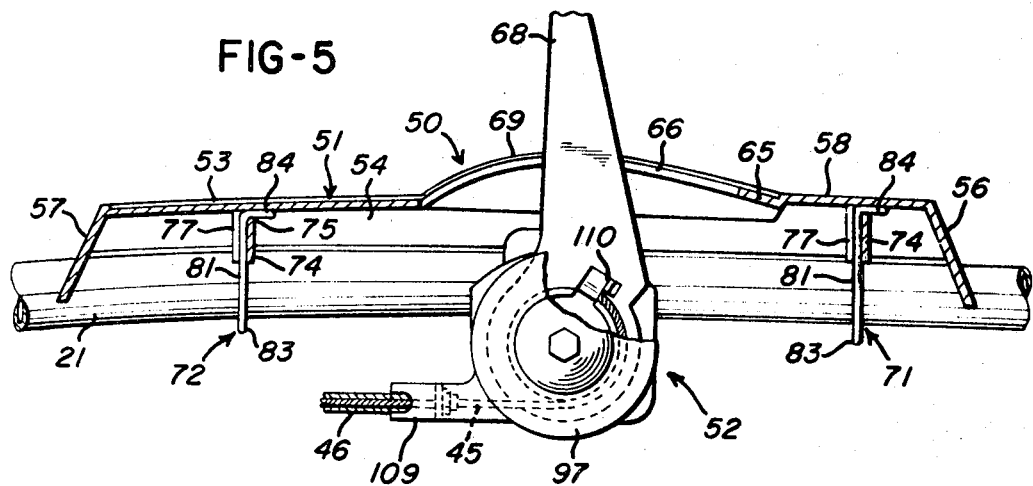
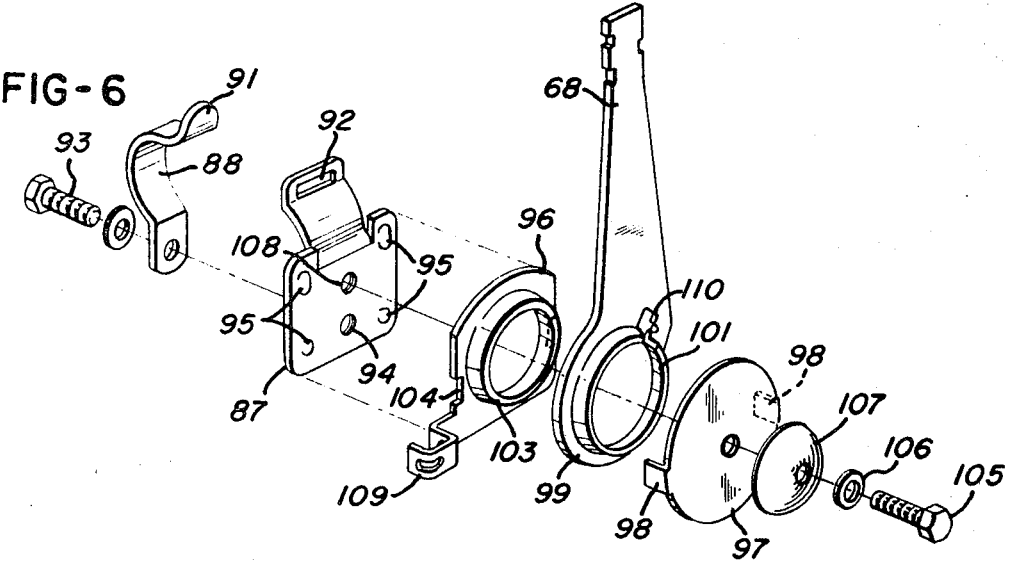

United States Patent Office 3,443,825
Patented May 13, 1969

3,443,825
SHIFT CONSOLE FOR BICYCLE
Donald A. Wolf, Dayton, Ohio, assignor to The Huffman Manufacturing Company, Miamisburg, Ohio, a corporation of Ohio
Filed July 3, 1967, Ser. No. 650,963
Int. Cl. B62j 39/00; G05g 11/00
U.S. Cl. 280—289     9 Claims

ABSTRACT OF THE DISCLOSURE

A bicycle having a console adapted to be mounted on the support tubes between the front fork and seat masts to provide a guide for the shift lever which is mounted in association therewith. The console engages the twin tubes and is releasably held in position by a pair of wire brackets.

Background of the invention

For many years it has been the practice to provide various types of gear shift mechanisms for bicycles which vary the ratio between speed of the crank and the rear wheel. One such expedient is to provide a plurality of drive sprockets mounted coaxially on the rear hub and a shift mechanism for moving the chain from one drive sprocket to another to vary the relative speed of rotation between the crank and the drive sprockets. A guide is utilized to shift the chain from one drive sprocket to another, and this guide is positioned by a shift lever operating through flexible control cable or Bowden wire. A chain tensioning mechanism is provided so that the chain is held under tension even when the chain engages the smallest of the drive sprockets.

The shift mechanism for operating the control cable and those for other types of shift mechanisms may be mounted on the handle bars adjacent one of the handle grips so that the shifting can be done without moving the hands from the handle grip. Frequently, the shift mechanism moves the wire as a result of twisting a specially designed handle grip. However, when hand brakes are used on both wheels, it is necessary to provide the brake handles adjacent each of the handle grips so that it is difficult to position a shift lever from the handle bars because of possible interference with the brake handles.

Moreover, since the handle bars turn with respect to the remainder of the frame, sufficient flexibility must be provided in the control cable to allow this pivoting movement. Such flexing will frequently deform the cable causing difficult operation of the shifting mechanism, as well as changes in length of the operating wire so that the close tolerances necessary to position properly the shift mechanism are not maintained.

Summary of the invention

Accordingly, applicant has provided a mechanism mounted on the top tubes of the bicycle for shifting the operation which requires a much shorter operating cable which is not flexed in any way during the operation of the bicycle. A removable console is provided for enclosing the shift lever which is secured to a top tube, and the lever extends upwardly through a slot in the console which has indicia thereon for indicating which drive sprocket the chain is engaging. In the preferred form, the console is mounted between parallel top tubes.

Brief description of the drawings

FIG. 5 is another sectional view taken along the line 5—5 of FIG. 3; and

FIG. 6 is an exploded view of the shift lever assembly.

Detailed description of the drawings

Figure 1:
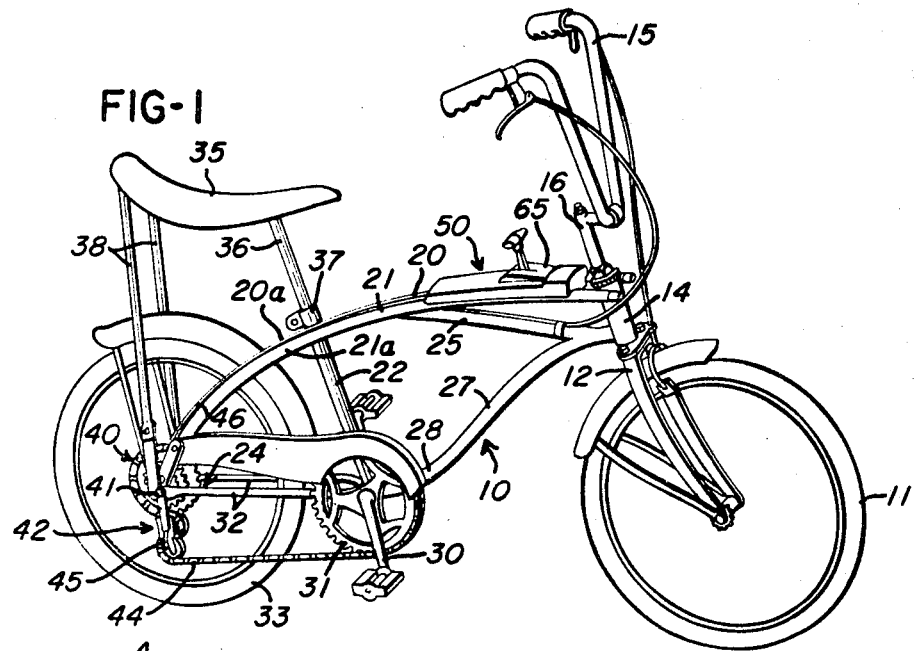
FIG. 1 illustrates a perspective view of a bicycle embodying the shift console in accordance with the invention.

Referring to FIG. 1, the bicycle 10 includes a front wheel 11 mounted on the fork 12 pivotally supported on the bicycle frame by the fork mast 14. A pair of handle bars 15 are mounted on the upper end 16 of the fork 12 for pivoting the fork in the usual manner. A pair of parallel top tubes 20 and 21 extend rearwardly from a welded tangential connection with the fork mast 14 to a similar connection with the generally vertical seat mast 22.

An upper truss tube 25 is secured near the forward end of the front tube 27 and extends rearwardly between the parallel tubes 20 and 21 and is welded to the upper portion of the seat mast 22. The rear end 28 of the front tube 27 is secured to a tubular sprocket housing (not shown) which supports the crank 30 and the large crank sprocket 31 in the usual manner. A horizontal tube 32 extends from a rigid connection with the sprocket housing to engagement with the rear section 20a and 21a of the tubes 20 and 21 to complete the rear fork 24 which supports the rear wheel 33. The elongated "banana" type seat 35 has its forward end supported by the seat post 36 which is received in the seat mast 22 and clamped in position by the collar 37, while the rear portion of the seat is supported by the parallel braces 38 which extend downwardly and are secured to the ends of the rear fork members 20a and 21a.

The conventional rear hub assembly includes a plurality of drive sprockets 40 of progressively smaller diameter mounted coaxially on the rear axle 41 for driving the rear wheel. The guide mechanism 42 is utilized to move the drive chain 44 from one of the sprockets to another in accordance with the movement of the movable control wire 45 which reciprocates in the tubular sheath 46. Similarly, the guide mechanism 42 includes an idler which is spring mounted to pivot in a clockwise direction, as viewed in FIG. 1, to exert pressure and thus maintain tension on the chain 44 regardless of which sprocket 40 that the chain 44 engages.

Figure 2:
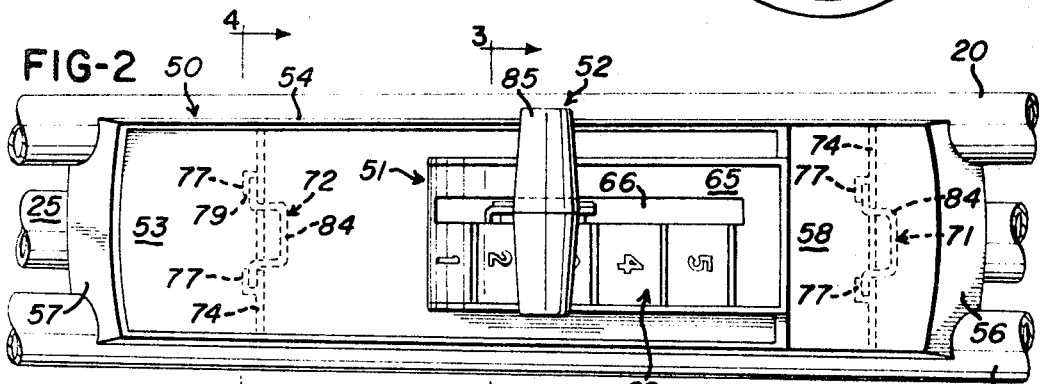
FIG. 2 is a plan view of the console mounted on a bicycle.

An important feature of this invention is the shift mechanism 50 which includes the console 51 and shift lever assembly 52 for operating the control wire 45 to effect the shifting of the chain 44 from one drive sprocket 40 to another. The console 51, as shown in FIGS. 2-5, may be constructed of a relatively rigid plastic and includes a relatively flat top wall 53 having the downwardly extending side walls 54 formed integrally therewith. The front and rear end walls 56 and 57 are disposed generally perpendicular to the length of the tubes 20 and 21 and taper downwardly (FIG. 5) from integral connections to the top and side walls 53 and 54. The forward end of the top wall 53 may be raised at 58, as shown in FIGS. 1 and 2.

The circular cutouts 61 and 62 are provided at the lower corners of each of the end walls 56 and 57 with a diameter substantially equal to the outer diameter of the parallel tubes 20 and 21. Similarly, the centers of these cutouts are spaced apart a distance equal to the distance between the center lines of the parallel tubes 20 and 21 so that these tubes receive the console 51 in the manner shown in FIG. 4 wherein the lower edges 64 of the side walls 54 engage the top surface of the tubes 20 and 21 and the edges of the cutouts 61 and 62 intimately seat on the tubes.

A rounded projection 65 is provided centrally in the top wall 53 with the elongated slot 66 cut therein aligned with the shift lever 68 which extends upwardly therethrough. The indicia 69 are provided on the top surface of the projection to indicate precisely the position of the shift lever 68, as will be described.

The interior of the console 51 includes front and rear connectors 71 and 72 which are used to secure the console securely in position on the tubes 20 and 21. Each connector includes a downwardly extending transverse partition 74 which is integrally formed with the top and side walls 53 and 54 (FIG. 2) and has an elongated horizontal slot 75 (FIG. 5) in the upper central portion thereof adjacent the top wall 53. A pair of inwardly extending ears 77 are provided on the partition 74, and extend in a vertical direction, as shown in FIG. 2, to define an opening 78 between the inner edges 79 thereof.

Figure 4:
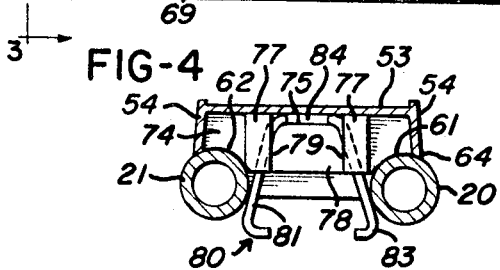
FIG. 4 is another sectional view taken along the line 4—4 of FIG. 2.

The connectors 71 and 72 each include a generally U-shaped wire 80 having the side portions 81 with their lower ends 83 curved inwardly and a horizontal upper loop 84 formed in the upper central portion thereof (FIG. 2). Thus, when the side portions 81 are forced together, the upper loop 84 can be inserted through the slot 75 in the partitions 74 with the side portions 81 expanding into the grooves behind the ears 77 (FIG. 4). When the console 50 is placed on the parallel tubes 20 and 21, the side portions 81 will be forced together until the console is in position at which time the ends 83 provide a pressure against the tubes 20 and 21 to hold the console 51 in position.

Figure 3:
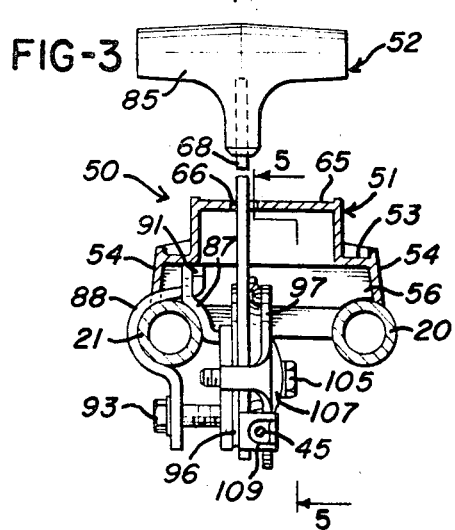
FIG. 3 is a sectional view taken along the line 3—3 of FIG. 2.

The shift lever assembly 52 is shown in FIGS. 3–6 and includes a shift lever 68 having the handle 85 on the top end thereof. The assembly also includes a mounting bracket 87 clamped to the left hand tube 20 by the bracket 88 having the tongue 91 which extends through the slot 92 in the bracket 87 and whose lower end is secured thereto by the screw 93 which is threadedly received in the opening 94 to hold the mounting bracket 87 rigidly on the tube 20. The pivot plate 96 is welded to the bracket 87 by the weld projections 95. The washer 97 having the axially extending fingers 98 thereon is then placed over the lower end 99 of the shift lever 68 so that the shoulder 101 on the lever is received around the similar annular shoulder 103 of the pivot plate 96. In this position, the fingers 98 pass radially outwardly of the lower end of the lever 68, and are received in the complementary slots 104 in the pivot plate 96 so that the pivot plate 96 and washer 97 are secured against relative angular movement with the lever 68 clamped therebetween for rotation on the annular shoulder 103. These members are held on the bracket 87 by the screw 105 which extends through the lock washer 106, the concave disk spring 107, and into the threaded opening 108 in the bracket 87, as shown in FIG. 3.

Accordingly, by pushing the handle 85 in a forward or rearward direction, the lever 68 rotates about the center line of the pivot screw 105. Since the outer sheath 46 of movable control wire 45 is secured to the arm 109 on the pivot bracket 96, while the wire 45 is connected to the shift lever at 110 this movable wire is advanced or retracted in the sheath 46 as the lever 68 is pivoted to shift the guide 42 and cause the chain to climb from one drive sprocket 40 to another. The shift assembly 52 is enclosed by the console 51 so that there is little danger of contact between the operator and the control wire 45 or its sheath 46. The position of the lever 68 is indicated by the numbers included in the indicia 69 on the projection 65 of the console 51 so that the operator knows the drive sprocket 40 on which the chain 44 is engaged.

While the invention has been illustrated in connection with a multi-drive sprocket arrangement, it is possible to utilize the invention with other types of variable ratio drive mechanisms for bicycles without departing from the scope of the invention. Similarly, the specific configuration of the console is in no way intended to be a limitation on this invention since it is possible to modify the ornamental configuration thereof without departing from the invention. It is possible to modify the invention for use on other bicycle designs wherein there is only a single top tube rather than twin top tubes.

What is claimed is:

1. A console device adapted for use on a bicycle frame having top tubes disposed between the front fork and seat masts, said console device comprising an elongated housing having a width greater than the nearest distance between the top tubes, said housing including a top wall having front and rear end walls extending downwardly from said top wall, means defining a pair of circular cutouts in the lower portions of each of said front and rear end walls, said cutouts having a diameter substantially equal to the outer diameter of the tubes, said cutout of each pair being spaced apart a distance substantially equal to the distance between the tubes so that the tubes are received in said cutouts to seat said housing between the top tubes, and connector means for releasably securing said housing to at least one of the tubes.

2. A console device as defined in claim 1 comprising a gear shift mechanism adapted to be mounted on one of the tubes below said housing, means defining a slot in said top wall, and a shift lever on said mechanism extending upwardly through said slot.

3. A control console as defined in claim 2 wherein indicia are provided on the top surface of said top wall adjacent said slot so that the position of said lever can be readily determined by the operator.

4. A control consule as defined in claim 1 wherein said connector means includes a transverse partition in said housing, a horizontal slot in said side wall, a pair of spaced inwardly extending ears, and a spring clip having side portions adapted to be engaged by said ears and a central portion adapted to extend through said horizontal slot, said spring clip having end portions adapted to engage the tubes below the center line thereof to hold said housing on the top portion of the tubes.

5. A console device as defined in claim 4 wherein one of said connector means is mounted adjacent said front wall and one adjacent said rear wall.

6. A console device as defined in claim 1 wherein integral side walls are provided on said top wall, said side walls being parallel to and adapted to engage the top surfaces of said tubes.

7. A console device adapted for use on a bicycle frame having a pair of top tubes disposed side by side and between the front fork and seat masts, said control device comprising a console assembly adapted to be secured to the top tubes, said assembly including an elongated housing member having a width greater than the nearest distance between the top tubes, a shift mechanism mounted on at least one of the tubes and being disposed between the tubes, said mechanism including a shift lever which extends upwardly between the top tubes, means defining an elongated slot in said housing member through which said lever extends to a position above said housing member, indicia means on the top surface of said housing member adjacent said slot to indicate the precise position of said lever, and connector means for releasably securing said housing member to the top tubes to at least partially enclose said shift mechanism.

8. A console device adapted for use on a bicycle frame having tube means extending between the front fork and seat masts, said console device comprising an elongated housing, said housing including a top wall having front and rear end walls extending downwardly from said top wall and being generally perpendicular to the length of the tube means, means defining circular cutouts in the lowermost portions of each of said front and rear end walls, said cutouts having a diameter substantially equal to the outer diameter of the tube means, said cutouts adapted to receive said tube means so that said housing is seated thereon, means for releasably securing the housing to the tube means, means defining an elongated slot in said top wall, a shift lever assembly adapted to be secured to the tube means and having a lever extending upwardly through said slot for movement by the operator, and indicia on said top wall adjacent said slot for indicating the position of said lever.

9. A console assembly adapted for use on a bicycle having a pair of tubes disposed side by side and between the front fork and seat masts, said console assembly comprising, a housing means adapted to be secured to the pair of tubes and having a width greater than the spacing between the pair of tubes in the area wherein said housing means is secured to the tubes, an actuator lever mechanism associated with said housing means, said mechanism including a lever which extends upwardly above the pair of tubes and is selectively pivotal between first and second positions to influence operation of the bicycle, connector means for releasably securing said housing means to the pair of tubes to at least partially enclose said actuator lever mechanism, and handle means on said lever for moving said lever between said first and second positions.

References Cited

UNITED STATES PATENTS

| | | | |
|---|---|---|---|
| D. 210,990 | 5/1968 | Schreckengost. | |
| 525,724 | 9/1894 | Scott | 280—238 |
| 2,755,103 | 7/1956 | Douglas | 280—281 |
| 2,862,401 | 12/1958 | Gwin | 74—489 |
| 3,285,093 | 11/1966 | Sellmeyer | 74—566 |
| 3,352,173 | 11/1967 | Freeland | 280—236 |
| 3,364,782 | 1/1968 | Freeland | 74—487 |

OTHER REFERENCES

American Bicyclist and Motorcyclist Magazine, April 1958, p. 22.

KENNETH BETTS, *Primary Examiner.*

U.S. Cl. X.R.

74—488